United States Patent
Mania et al.

(10) Patent No.: US 9,856,173 B2
(45) Date of Patent: *Jan. 2, 2018

(54) ONE COMPONENT READY-TO-USE TILE GROUT

(71) Applicant: WACKER CHEMICAL CORPORATION, Adrian, MI (US)

(72) Inventors: Daniel J. Mania, Saline, MI (US); Uwe Scheim, Coswig (DE)

(73) Assignee: WACKER CHEMICAL CORPORATION, Adrian, MI (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/617,269

(22) Filed: Feb. 9, 2015

(65) Prior Publication Data

US 2016/0229749 A1    Aug. 11, 2016

(51) Int. Cl.
| | |
|---|---|
| *C04B 26/32* | (2006.01) |
| *C04B 40/06* | (2006.01) |
| *C04B 26/02* | (2006.01) |
| *C04B 26/04* | (2006.01) |
| *C04B 26/06* | (2006.01) |
| *C04B 26/16* | (2006.01) |
| *C04B 26/18* | (2006.01) |
| *C09D 5/34* | (2006.01) |
| *C08G 59/40* | (2006.01) |
| *C08G 77/46* | (2006.01) |
| *C08L 83/04* | (2006.01) |
| *C08G 65/336* | (2006.01) |
| *C04B 111/00* | (2006.01) |
| *C04B 111/70* | (2006.01) |

(52) U.S. Cl.
CPC .............. *C04B 26/32* (2013.01); *C04B 26/02* (2013.01); *C04B 26/045* (2013.01); *C04B 26/06* (2013.01); *C04B 26/16* (2013.01); *C04B 26/18* (2013.01); *C04B 40/0625* (2013.01); *C08G 59/4057* (2013.01); *C08G 65/336* (2013.01); *C08G 77/46* (2013.01); *C08L 83/04* (2013.01); *C09D 5/34* (2013.01); *C04B 2111/00672* (2013.01); *C04B 2111/70* (2013.01)

(58) Field of Classification Search
CPC ..... C04B 26/32; C04B 40/0625; C04B 26/02; C04B 26/045; C04B 26/06; C09D 5/34; C08G 59/4057; C08L 83/04
See application file for complete search history.

(56) References Cited

U.S. PATENT DOCUMENTS

| | | | |
|---|---|---|---|
| 4,833,178 A | 5/1989 | Schaefer et al. | |
| 5,976,371 A * | 11/1999 | Giorgini ................. | C08G 18/10 156/106 |
| 6,884,852 B1 | 4/2005 | Klauck et al. | |
| 7,319,128 B2 | 1/2008 | Ziche et al. | |
| 7,332,541 B2 | 2/2008 | Schindler et al. | |
| 7,977,445 B2 | 7/2011 | Hattemer et al. | |
| 8,101,704 B2 | 1/2012 | Baumann et al. | |
| 9,328,259 B1 * | 5/2016 | Andrews ............... | C09D 183/04 |
| 2006/0257281 A1 | 11/2006 | Weide et al. | |
| 2007/0167598 A1 | 7/2007 | Stanjek et al. | |
| 2010/0305263 A1 | 12/2010 | Prasse | |
| 2011/0179743 A1 | 7/2011 | Taylor et al. | |
| 2011/0198030 A1 | 8/2011 | Burckhardt | |
| 2011/0209435 A1 | 9/2011 | Taylor et al. | |
| 2012/0067520 A1 * | 3/2012 | Schubert ................. | C08B 15/05 156/329 |
| 2012/0208029 A1 | 8/2012 | Lin | |
| 2013/0034514 A1 | 2/2013 | Schweinsberg | |
| 2014/0007792 A1 | 1/2014 | Posthumus et al. | |
| 2014/0155545 A1 | 6/2014 | Stanjek et al. | |
| 2015/0009566 A1 | 1/2015 | Iyer et al. | |
| 2015/0203729 A1 * | 7/2015 | Stanjek ................ | C08G 65/336 524/500 |

FOREIGN PATENT DOCUMENTS

| | | |
|---|---|---|
| DE | 10 2007 023 932 A1 | 11/2008 |
| DE | 10 2011 081 264 A1 | 2/2013 |
| EP | 1 093 482 B1 | 4/2001 |
| EP | 1 641 854 B1 | 4/2006 |
| EP | 1 535 940 A1 | 6/2006 |
| EP | 1 896 523 B1 | 3/2008 |
| EP | 2 189 485 A1 | 5/2010 |
| EP | 2 508 580 A1 | 10/2012 |
| WO | 2005/071165 A1 | 8/2005 |
| WO | 2007072189 A2 | 6/2007 |
| WO | 2011/110384 A1 | 9/2011 |
| WO | 2011110384 A1 | 9/2011 |

* cited by examiner

*Primary Examiner* — John Uselding

(74) *Attorney, Agent, or Firm* — Brooks Kushman P.C.

(57) ABSTRACT

Stable emulsions of silicone terminated polyethers and silicone resins are used to prepare one-component grout with very good mechanical properties gained within a short time after the grout cures by adding a proportion of aggregate to the emulsions.

13 Claims, No Drawings

ONE COMPONENT READY-TO-USE TILE GROUT

BACKGROUND OF THE INVENTION

1. Field of the Invention

The present invention pertains to one-component polymer grouts.

2. Description of the Related Art

The process of grouting has been practiced now for millennia. The Romans, for example, employed a variety of grouts including pozzolanic grouts in building, road, and bath construction, as well as more conventional grouts based on calcined lime without pozzolan. One of the most widespread modern uses of grouting is to seal spaces between adjoining stones or tile, particularly the latter, for example in floors, walls, and particularly in shower enclosures. In the construction of such surfaces, the substrate, for example tile or stone, is adhered to a surface through the use of a tile adhesive, which is generally cementitious. In general, each tile or stone is separated from its neighbors by a relatively uniform distance, thus creating an empty space between the substrates. This empty space is filled with a "grout" of very high mineral content.

Cementitious grouts have been commonly used, and are relatively inexpensive. However, the application of cementitious grouts is labor-intensive and wasteful. For a tile floor or shower enclosure, for example, the dry grout composition is first mixed with water to form a relatively viscous semi-solid mixture, and this mixture is forced into the open spaces between the tiles using a tool. Tools for this use, for example, may be termed grouting floats or grouting paddles. In general, it is impossible to inject grout between tiles with devices such as caulking guns, since many if not most grouts are relatively dilatant, and thicken to a reversible, non-extrudable consistency upon application of pressure. By the use of a float, grout can easily be forced into the empty space between tiles and other substrates. However, a significant portion of grout also adheres to the face of the tiles or other substrate. In the case of porous substrates such as brick, the grout must be removed using strong acid. In the case of smooth substrates such as glazed tile, in general, the grout is allowed to partially cure, and then the grout which adheres to the face of the tile is removed with a wet sponge. The wet sponge is also used to smooth the grout to provide a uniform appearance. The craftsman must be careful that the grout does not harden so much that acid is again necessary to remove it. Moreover, the craftsman must also not use a sponge which is too wet, or use too much pressure on the sponge, as this action may actually remove grout from inbetween the substrates.

Cementitious grouts have the advantages of high compressive strength. However, the tensile strength of cementitious grouts is relatively low. The adhesion of cementitious grouts to the sides of the substrate and to the substrate support may vary over a wide range. To improve these qualities, it has been common to add very fine polymer particles to the grout. These polymer particles are preferably of the type referred to as "redispersible polymers" which are characterized by both a very small particle size, as well as film-forming capability. These polymers may be added in the dry state as a powder to the grout in a so-called "ready mix" formulation, or may be added in the form of an aqueous polymer dispersion, which is used in place of at least part and sometimes all of the mix water. The use of these polymers in "polymer-modified grout" can improve the adhesive qualities of the grout, the flexural strength of the grout, the tensile strength of the grout, and in some cases, with proper selection of polymer, the water resistance of the grout. Despite the advantages of polymer-modified grouts, which are somewhat more expensive than ordinary cementitious grouts, the grouting process is still essentially the same as that which has been used since at least Roman times, as discussed previously.

Curable "polymer grouts" have also been proposed. In these grouts, the hydraulically settable components of the cementitious grouts are replaced by curable polymers. For example, so-called "epoxy grouts" have been available for numerous years (e.g. U.S. Pat. No. 4,833,178). These grouts, however, suffer from several disadvantages: firstly, they must be supplied as a two-component mixture; secondly, once mixed, the mixture has little pot life and must be used rapidly, this mixing can lead to non-uniform color between mixes; and finally, the chemistry used may be hazardous to the health of the operator. Furthermore it is difficult to remove staining of the tiles which often results in a haze like layer on the surface of the tiles jointed together.

Grouts supplied as one-component systems have been proposed. But currently available one-component polymer grouts are typically water-based acrylics and are not intended, nor are they recommended, for use in high-traffic areas or areas with high exposure to water.

Therefore, it would be desirable to provide a grout for high-traffic applications which does not require mixing at the jobsite, which is a one-component rather than a two-component grout, and which provides color uniformity. It would be further desirable to provide a grout which offers high flexural modulus, good adhesion to substrates, water resistance similar to two-component epoxy grouts, and exceeds standard water-based acrylic one-component grouts. It would be further desirable to provide a one-component grout free of any hazardous ingredients.

SUMMARY

It has now been surprisingly and unexpectedly discovered that stable emulsions of silicone terminated polyethers and silicone resins can be used to prepare one-component grouts with very good mechanical properties gained within a short time after the grout cures by adding a proportion of aggregate to the emulsions.

DETAILED DESCRIPTION

The elastomeric silicone emulsions to which aggregate is to be added are oil-in-water emulsions. Such emulsions are produced by dispersion of an organopolysiloxane ("silicone") into water with the aid of a surfactant or dispersing aid. A large number of different types of surfactants, or "emulsifiers" may be used, including anionic surfactants, cationic surfactants, zwitterionic surfactants, and non-ionic surfactants, particularly the latter. Partially hydrophobic inorganic particles in the nanometer size range may also be used, these particles containing both hydrophobic and hydrophilic portions which mimic conventional surfactant structure.

The elastomeric silicone emulsions may be emulsions containing essentially at least one silane-crosslinking polymer of the formula:

(A) a silyl-terminated polymer of formula (I)

$$Y—[(CR^1_2)_b—SiR_a(OR^2)_{3-a}]_x \qquad (I),$$

wherein
Y comprises a polyurethane or polyoxyalkylene polymer residue which is x-valent and attached to $(CR^1{}_2)$ via nitrogen, oxygen, sulfur or carbon,
R each independently is a monovalent, optionally substituted hydrocarbyl radical,
$R^1$ each independently is hydrogen or a monovalent, optionally substituted hydrocarbyl radical optionally attached to carbon of the $CR^1{}_2$ group via nitrogen, phosphorus, oxygen, sulfur or a carbonyl group,
$R^2$ each individually is hydrogen or a monovalent, optionally substituted hydrocarbyl radical,
x is an integer from 1 to 10,
a each individually is 0, 1, or 2, and
b each individually is an integer from 1 to 10;
optionally (B) a silicone compound containing units of the formula (II)

$R^3$ each independently is alkyl, aryl, aminoalkyl, glycidoxy alkyl, mercapto alkyl,
$R^4$ each independently is alkyl, aryl,
$R^5$ each independently is alkyl, hydrogen, ethylene oxide, propylene oxide,
a is 0-3, preferably 1,
b is 0-2, preferably 0,
c is 0, 1, 2, or 3, preferably 0-2,
with the proviso that a+b+c≤4, corresponding to oligomers, polymers, and silanes;
preferably, a+b+c<4, corresponding to oligomers or polymers; and
(C) emulsifier(s);
(D) water;
(E) filler aggregate(s);
further optionally:
(F) catalyst(s); and/or
(G) additive(s).

Examples of R radicals are alkyl radicals such as methyl, ethyl, n-propyl, isopropyl, 1-n-butyl, 2-n-butyl, isobutyl, tert-butyl, n-pentyl, isopentyl, neopentyl, and tert-pentyl; hexyl radicals such as n-hexyl; heptyl radicals such as n-heptyl; octyl radicals such as n-octyl, isooctyl and 2,2,4-trimethylpentyl; nonyl radicals such as n-nonyl; decyl radicals such as n-decyl; dodecyl radicals such as n-dodecyl; octadecyl radicals such as n-octadecyl; cycloalkyl radicals such as cyclopentyl, cyclohexyl, cycloheptyl and methylcyclohexyl; alkenyl radicals such as vinyl, 1-propenyl and 2-propenyl; aryl radicals such as phenyl, naphthyl, anthryl and phenanthryl; alkaryl radicals such as o-, m-, p-tolyl xylyl and ethylphenyl; and aralkyl radicals such as benzyl, α-phenylethyl and β-phenylethyl.

Examples of substituted R radicals are haloalkyl radicals such as 3,3,3-trifluoro-n-propyl, 2,2,2,2',2',2'-hexafluoroisopropyl and heptafluoroisopropyl, and haloaryl radicals such as o-, m-, and p-chlorophenyl.

The R radicals are preferably monovalent hydrocarbyl radicals of 1 to 6 carbon atoms, optionally substituted with halogen atoms, more preferably alkyl radicals of 1 or 2 carbon atoms, especially the methyl radical.

Examples of $R^1$ radicals are hydrogen, the radicals recited for R and also optionally substituted hydrocarbyl radicals bonded to carbon via nitrogen, phosphorus, oxygen, sulfur, carbon, or a carbonyl group. It is preferable for the $R^1$ radical to represent hydrogen or hydrocarbyl radicals of 1 to 20 carbon atoms, particularly, hydrogen.

Examples of the $R^2$ radical are hydrogen or the examples recited for the R radical.

The $R^2$ radical is preferably hydrogen or an alkyl radical of 1 to 10 carbon atoms optionally substituted with halogen atoms, more preferably alkyl radicals of 1 to 4 carbon atoms, and especially the methyl or ethyl radicals.

Y in the silane-crosslinking polymer of component (A) may represent a residue of any polymer where at least 50%, preferably at least 70%, and more preferably at least 90%, of all bonds in the main chain are carbon-carbon, carbon-nitrogen, or carbon-oxygen bonds. Examples of Y polymer residues are polyester, polyether, polyurethane, polyalkylene, and polyacrylate residues.

The polymer residue Y is preferably an organic polymer residue where the polymer chain comprises polyoxyalkylenes such as polyoxyethylene, polyoxypropylene, polyoxybutylene, polyoxytetramethylene, polyoxyethylene-polyoxypropylene copolymer and polyoxypropylene-polyoxybutylene copolymer.

The $[(CR^1{}_2)_b—SiR_a(OR^2)_{3-a}]$ group or groups is preferably linked via —O—C(=O)—NH—, —NH—C(=O) O—, —NH—C(=O)—NH—, —NR'—C(=O)—NH—, NH—C(=O)—NR'—, —NH—C(=O)—, —C(=O)— NH—, —C(=O)—O—, —O—C(=O)—, —O—C (=O)—O—, —S—C(=O)—NH—, —NH—C(=O)— S—, —C(=O)—S—, —S—C(=O)—, —S—C(=O)— S—, —C(=O)—S—, —S—, —O—, —NR'—, wherein R', which may be the same or different in each occurrence, has a meaning recited for R or represents a —CH(COOR")— $CH_2$—COOR" group in which R", which may be the same or different in each occurrence, has a meaning recited for R.

The R' radical is preferably a —CH(COOR")—$CH_2$— COOR" group or an optionally substituted hydrocarbyl radical of 1 to 20 carbon atoms, more preferably a linear, branched or cyclic alkyl group of 1 to 20 carbon atoms, or an aryl group of 6 to 20 carbon atoms which is optionally substituted with halogen atoms.

Examples of R' radicals are cyclohexyl, cyclopentyl, n-propyl, isopropyl, n-butyl, isobutyl, t-butyl, the various stereoisomers of the pentyl radical, of the hexyl radical, or of the heptyl radical, and also phenyl.

The R" radicals are preferably alkyl groups of 1 to 10 carbon atoms, more preferably the methyl, ethyl, or propyl radicals.

The —$[(CR^1{}_2)_b—SiR_a(OR^2)_{3-a}]$ groups attached as described may be present in component (A) at any desired position of the polymer chain, for instance internally and/or terminally.

Polymers (A) are obtainable via known methods such as addition reactions, e.g., hydrosilylation, Michael addition, Diels-Alder addition, or reactions between isocyanate-functional compounds with compounds having isocyanate-reactive groups, the latter being preferred.

It is especially preferable for the Y residue in formula (I) to represent polyurethane residues and polyoxyalkylene residues, especially polyoxyalkylene residues.

When representing polyurethane residues, Y preferably represents polyurethane residues whose chain ends are attached to the —$[(CR^1{}_2)_b—SiR_a(OR^2)_{3-a}]$ group or groups via —NH—C(=O)O—, —NH—C(=O)—NH—, —NR'—C(=O)—NH— or —NH—C(=O)—NR'—, especially via —O—C(=O)—NH— or —NH—C(=O)— NR'—, while all the radicals and indices have one of the abovementioned meanings. The polyurethane residues Y are obtainable with preference from linear or branched polyoxyalkylenes, in particular from polypropylene glycols, and di- or polyisocyanates. Average molar masses $M_n$ of Y residues are preferably in the range from 10,000 to 30,000 g/mol and more preferably in the range from 11,000 to 20,000 g/mol. Suitable methods of preparing a corresponding component (A) and also examples of component (A) itself are described inter alia in EP 1 093 482 B1 (paragraphs [0014]-[0023], [0039]-[0055] and also Example 1 and Comparative Example 1) or EP 1 641 854 B1 (paragraphs [0014]-[0035], Examples 4 and 6 and also Comparative Examples 1 and 2), or their U.S. equivalents, U.S. Pat. No. 6,884,852 and U.S. Published Application 2007/0167598, the disclosures of which are incorporated herein by reference.

When representing polyoxyalkylene residues, Y preferably represents linear or branched polyoxyalkylene residues, more preferably polyoxypropylene residues whose chain ends are preferably attached to the $-[(CR^1{}_2)_b-SiR_a(OR^2)_{3-a}]$ group or groups via $-O-C(=O)-NH-$. The average molar masses $M_n$ of polyoxyalkylene residues Y are preferably in the range from 10,000 to 30,000 g/mol, more preferably in the range from 11,000 to 20,000 g/mol. Suitable methods of preparing an appropriate component (A) and also examples of component (A) itself are described inter alia in EP 1 535 940 B1 (paragraphs [0005]-[0025] and also Examples 1-3 and Comparative Examples 1-4) or EP 1 896 523 B1 (paragraphs [0008]-[0047]), or their U.S. equivalents, U.S. Pat. No. 7,319,128 and U.S. Pat. No. 8,101,704, the disclosures of which are incorporated herein by reference.

The end groups of compounds (A) are preferably those of general formulae

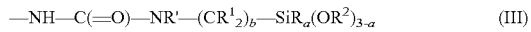

and

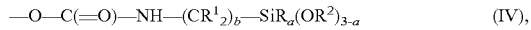

wherein the radicals and indices have any of the meanings recited therefor above.

The end groups of compounds (A) are more preferably those of formula (IV), most preferred with b=1 and a=0 or 1.

The component (A) is preferably a silane-terminated polyoxyalkylene, more preferably a silane-terminated polyoxypropylene, having end groups of formula (IV), where $R^1$ represents a hydrogen atom, R represents methyl, $R^2$ represents methyl or ethyl, b represents 1 and a represents 0 or 1. The silane-terminated polyoxyalkylenes preferably contain exclusively polyether units in addition to the end groups (IV). The number of end groups of formula (IV) per molecule of polymers (A) is preferably 2 or 3, more preferably 2.

An immense advantage of silane-terminated polyoxyalkylenes having end groups of formula (IV) over silane-terminated polyoxyalkylenes having different end groups is their sheer simplicity of preparation, via a reaction of common, hydroxyl-terminated polyoxyalkylenes with silanes of the formula

wherein all the radicals and indices have any of the above-mentioned meanings. What is decisive in this connection is that this reaction provides for a substantially complete termination of existing chain ends, making this method significantly different from other methods, for example a hydrosilylation of α, ω-unsaturated polymers with SiH-functional silanes.

This substantially complete termination leads surprisingly to distinctly better properties, especially to distinctly better tensile strengths, for compositions comprising the polymers (A), versus polymers whose end groups were synthesized in some other way, for example via hydrosilylation.

The proportion of chain ends terminated with end groups of formula (IV) in the silane-terminated polymers (A) is preferably at least 85%, more preferably at least 90%, and most preferably at least 95%. Preference for use as component (A) is given in particular to linear polyoxypropylenes whose chains are terminated with end groups of formula (IV) to an extent of at least 85%, more preferably to an extent of at least 90%, and most preferably to an extent of at least 95%.

The average molecular weights $M_n$ of compounds (A) are preferably at least 10,000 g/mol, more preferably at least 11,000 g/mol, and preferably at most 30,000 g/mol, more preferably at most 24,000 g/mol, and most preferably at most 22,000 g/mol.

The viscosity of compounds (A) is preferably at least 0.2 Pas, more preferably at least 1 Pas, and even more preferably at least 5 Pas, and preferably at most 700 Pas, more preferably at most 100 Pas, all measured at 20° C.

The component (A) may comprise just one species of formula (I) compounds as well as mixtures of different species of formula (I) compounds. In effect, component (A) may exclusively comprise formula (I) compounds in which more than 90%, preferably more than 95%, and most preferably more than 98% of all silyl groups attached to the A residue are identical. But, it is also possible to use component (A) comprising at least in part formula (I) compounds, wherein different silyl groups are attached to an A residue. Finally, component (A) may also comprise mixtures of various formula (I) compounds comprising altogether at least two different species of silyl groups attached to A residues provided. Preferably, all the silyl groups attached to any one A residue are identical.

When component (A) comprises various species of formula (I) compounds, preference is given to mixtures comprising not only compounds (A1) having end groups of formula (III) or (IV) where b=1, $R^1$=H, and a=0 or 1 in each, but also compounds (A2) having end groups of formula (III) or (IV) where b=3, $R^1$=H, and a=0 in each of which, and particular preference is given to those in which the weight ratio of (A1) to (A2) is in the range from 0.1 to 10, preferably from 0.2 to 5.

Compounds (A) are commercially available products or are obtainable by common chemical methods. Examples of commercially available compounds (A) are the products GENIOSIL® STP-E 10, STP-E 15, STP-E 30, or STP-E 35 from Wacker-Chemie AG.

The alkoxysilyl polymer (A) used in the examples below is α,ω-dimethoxymethylsilylmethylcarbamate terminated polyoxypropyleneglycol with an average molecular weight $M_n$ of about 12,500 g/mol.

The emulsions may optionally include silicone resins, highly cross-linked, network-like polymers which are generally prepared by the hydrolysis of trichlorosilanes, trialkoxysilanes, tetrachlorosilane, or tetraalkoxysilanes, and mixtures thereof. The emulsions may optionally include the following exemplary silicone resins as component (B):

$(MeSiO_{3/2})_{0.88}(MeSi(OH)O_{2/2})_{0.05}(MeSi(OEt)O_{2/2})_{0.06}$
$(Me_2SiO_{2/2})_{0.01}$ with Mw=6600 g/mol, Mn=2000 g/mol and Mw/Mn=3.3;

$(MeSiO_{3/2})_{0.86}(MeSi(OH)O_{2/2})_{0.02}(MeSi(OEt)O_{2/2})_{0.10}$
$(Me_2SiO_{2/2})_{0.02}$ with Mw=10,000 g/mol, Mn=2300 g/mol and Mw/Mn=4.3;

$(MeSiO_{3/2})_{0.71}(MeSi(OH)O_{2/2})_{0.03}(MeSi(OEt)O_{2/2})_{0.05}$
$(Me_2SiO_{2/2})_{0.21}$ with Mw=4500 g/mol, Mn=1900 g/mol and Mw/Mn=2.4;

$(MeSiO_{3/2})_{0.88}(MeSi(OH)O_{2/2})_{0.05}(MeSi(OMe)O_{2/2})_{0.06}(Me_2SiO_{2/2})_{0.01}$ with Mw=9000 g/mol, Mn=2300 g/mol and Mw/Mn=3.9;

$(MeSiO_{3/2})_{0.33}(MeSi(OH)O_{2/2})_{0.05}(MeSi(OEt)O_{2/2})_{0.01}(Me_2SiO_{2/2})_{0.06}$ $(PhSiO_{3/2})_{0.24}(PhSi(OH)O_{2/2})_{0.28}(PhSi(OEt)O_{2/2})_{0.03}$ with Mw=3250 g/mol, Mn=1300 g/mol and Mw/Mn=2.5;

$(MeSiO_{3/2})_{0.34}(MeSi(OH)O_{2/2})_{0.03}(MeSi(OEt)O_{2/2})_{0.02}(PhSiO_{3/2})_{0.45}$ $(PhSi(OH)O_{2/2})_{0.13}(PhSi(OEt)O_{2/2})_{0.03}$ with Mw=4700 g/mol, Mn=1800 g/mol and Mw/Mn=2.6;

$(MeSiO_{3/2})_{0.27}(MeSi(OH)O_{2/2})_{0.03}(PhSiO_{3/2})_{0.34}(PhSi(OH)O_{2/2})_{0.14}$ $PhSi(OEt)O_{2/2})_{0.02}(PhMeSiO_{2/2})_{0.17}(PhMeSi(OH)O_{1/2})_{0.03}$ with Mw=2400 g/mol, Mn=1200 g/mol and Mw/Mn=2.0;

$(PhSiO_{3/2})_{0.45}(PhSi(OH)O_{2/2})_{0.44}PhSi(OEt)O_{2/2})_{0.09}(PhSi(OH)_2O_{1/2})_{0.02}$ with Mw=2900 g/mol, Mn=1500 g/mol and Mw/Mn=1.9;

$(PhSiO_{3/2})_{0.48}(PhSi(OH)O_{2/2})_{0.17}(PhSi(OEt)O_{2/2})_{0.02}(CH_3(CH_2)_2SiO_{3/2})_{0.25}(CH_3(CH_2)_2Si(OH)O_{2/2})_{0.08}$ with Mw=1800 g/mol, Mn=1250 g/mol and Mw/Mn=1.4;

$(MeSiO_{3/2})_{0.32}(MeSi(OH)O_{2/2})_{0.06}(MeSi(OEt)O_{2/2})_{0.01}(Me_2SiO_{2/2})_{0.06}(PhSiO_{3/2})_{0.23}(PhSi(OH)O_{2/2})_{0.29}(PhSi(OEt)O_{2/2})_{0.03}$ with Mw=1700 g/mol, Mn=1200 g/mol and Mw/Mn=1.4;

$(PhSiO_{3/2})_{0.50}(PhSi(OH)O_{2/2})_{0.15}(PhSi(OEt)O_{2/2})_{0.02}(CH_3(CH_2)_2SiO_{3/2})_{0.26}$ $(CH_3(CH_2)_2Si(OH)O_{2/2})_{0.07}$ with Mw=2800 g/mol, Mn=1200 g/mol and Mw/Mn=2.3;

$(MeSiO_{3/2})_{0.81}(MeSi(OH)O_{2/2})_{0.04}(MeSi(OEt)O_{2/2})_{0.05}(Me_2SiO_{2/2})_{0.10}$ with Mw=6500 g/mol, Mn=1900 g/mol and Mw/Mn=3.4; where Me is the methyl radical, Et is the ethyl radical, and Ph is the phenyl radical.

Further non-limiting examples of component B are:
$(SiO_{4/2})_{0.50}(Me_3SiO_{1/2})_{0.39}(Si(OEt)O_{3/2})_{0.06}(Si(OEt)_2O_{2/2})_{0.02}(Si(OEt)_3O_{1/2})_{0.01}(Si(OH)O_{3/2})_{0.02}$ with Mw=7400 g/mol, Mn=3100 g/mol and Mw/Mn=2.4;

$(SiO_{4/2})_{0.46}(Me_3SiO_{1/2})_{0.43}(Si(OEt)O_{3/2})_{0.07}(Si(OEt)_2O_{2/2})_{0.02}$—$(Si(OEt)_3O_{1/2})_{0.01}(Si(OH)O_{3/2})_{0.01}$ with Mw=1400 g/mol, Mn=900 g/mol and Mw/Mn=1.6;

$(SiO_{4/2})_{0.46}(Me_3SiO_{1/2})_{0.37}(ViMe_2SiO_{1/2})_{0.06}(Si(OEt)O_{3/2})_{0.07}$ $(Si(OEt)_2O_{2/2})_{0.02}$—$(Si(OEt)_3O_{1/2})_{0.01}(Si(OH)O_{3/2})_{0.04}$ with Mw=5300 g/mol, Mn=2600 g/mol and Mw/Mn=2.0;

$(SiO_{4/2})_{0.38}(Me_3SiO_{1/2})_{0.42}(ViMe_2SiO_{1/2})_{0.06}(Si(OEt)O_{3/2})_{0.07}$ $(Si(OEt)_2O_{2/2})_{0.02}$—$(Si(OEt)_3O_{1/2})_{0.01}(Si(OH)O_{3/2})_{0.04}$ with Mw=2600 g/mol, Mn=1600 g/mol and Mw/Mn=1.6;

$(MeSiO_{3/2})_{0.37}(MeSi(OEt)O_{2/2})_{0.46}(MeSi(OEt)_2O_{1/2})_{0.17}$ with Mw=2400 g/mol, Mn=900 g/mol and Mw/Mn=2.7;

$(MeSiO_{3/2})_{0.37}(MeSi(OH)O_{2/2})_{0.01}(MeSi(OEt)O_{2/2})_{0.46}(MeSi(OEt)_2O_{1/2})_{0.15}$—$(Me_2SiO_{2/2})_{0.01}$ with Mw=2400 g/mol, Mn=900 g/mol and Mw/Mn=2.7;

$(MeSiO_{3/2})_{0.29}(MeSi(OH)O_{2/2})_{0.01}(MeSi(OMe)O_{2/2})_{0.47}(MeSi(OMe)_2O_{1/2})_{0.23}$ with Mw=2300 g/mol, Mn=600 g/mol a Mw/Mn=3.8;

$(MeSiO_{3/2})_{0.32}(MeSi(OMe)O_{2/2})_{0.48}(MeSi(OMe)_2O_{1/2})_{0.20}$ with Mw=3300 g/mol, Mn=900 g/mol and Mw/Mn=3.7; $(PhSiO_{3/2})_{0.23}(PhSi(OMe)O_{2/2})_{0.51}(PhSi(OMe)_2O_{1/2})_{0.26}$ with Mw=1000 g/mol, Mn=700 g/mol and Mw/Mn=1.4;

$(MeSiO_{3/2})_{0.10}(MeSi(OMe)O_{2/2})_{0.17}(MeSi(OMe)_2O_{1/2})_{0.03}(PhSiO_{3/2})_{0.15}$ $(PhSi(OMe)O_{2/2})_{0.31}(PhSi(OMe)_2O_{1/2})_{0.20}(Me_2SiO_{2/2})_{0.04}$ with Mw=1800 g/mol, Mn=900 g/mol and Mw/Mn=2.0;

$(MeSiO_{3/2})_{0.10}(MeSi(OMe)O_{2/2})_{0.15}(MeSi(OMe)_2O_{1/2})_{0.03}$—$(MeSi(O(CH_2)_3CH_3)O_{2/2})_{0.03}(PhSiO_{3/2})_{0.15}(PhSi(OMe)O_{2/2})_{0.24}$—$(PhSi(OMe)_2O_{1/2})_{0.15}(PhSi(O(CH_2)_3CH_3)O_{2/2})_{0.06}(PhSi(OMe)(O(CH_2)_3CH_3)O_{1/2})_{0.04}(PhSi(O(CH_2)_3CH_3)_2O_{1/2})_{0.01}(Me_2SiO_{2/2})_{0.04}$ with Mw=1400 g/mol, Mn=800 g/mol and Mw/Mn=1.8;

$(i\text{-}OctSi(OMe)(OH)O_{1/2})_{0.01}(i\text{-}OctSi(OMe)O_{2/2})_{0.10}(i\text{-}OctSi$—$(OMe)_2O_{1/2})_{0.16}(MeSiO_{3/2})_{0.26}(MeSi(OMe)O_{2/2})_{0.36}(MeSi(OMe)_2O_{1/2})_{0.11}$ with Mw=3000 g/mol, Mn=1500 g/mol and Mw/Mn=2.0;

$(Si(OEt)_2O_{2/2})_{0.42}(Si(OEt)O_{3/2})_{0.19}(Si(OEt)_3O_{1/2})_{0.39}$ with Mw=1000 g/mol, Mn=800 g/mol and Mw/Mn=1.2;

$(Si(OEt)_2O_{2/2})_{0.48}(Si(OEt)O_{3/2})_{0.35}(Si(OEt)_3O_{1/2})_{0.09}(SiO_{4/2})_{0.08}$ with Mw=1400 g/mol, Mn=900 g/mol and Mw/Mn=1.6;

$(MeSiO_{3/2})_{0.23}(i\text{-}OctSiO_{3/2})_{0.06}(MeSi(OMe)O_{2/2})_{0.35}(i\text{-}OctSi(OMe)O_{2/2})_{0.09}(MeSi(OEt)_2O_{1/2})_{0.19}(i\text{-}OctSi(OEt)_2O_{1/2})_{0.08}$ with Mw=1400 g/mol, Mn=600 g/mol and Mw/Mn=2.3; and $(MeSiO_{3/2})_{0.22}(i\text{-}OctSiO_{3/2})_{0.05}(MeSi(OH)O_{2/2})_{0.01}(MeSi(OMe)O_{2/2})_{0.33}$ $(i\text{-}OctSi(OMe)O_{2/2})_{0.11}(MeSi(OMe)_2O_{1/2})_{0.20}(i\text{-}OctSi(OMe)_2O_{1/2})_{0.08}$ with Mw=1500 g/mol, Mn=650 g/mol and Mw/Mn=2.3; where Me is the methyl radical, Vi is the vinyl radical, Et is the ethyl radical, i-Oct is 2,4,4-trimethylpentyl radical, and Ph is the phenyl radical.

The silicone resins used in the examples below are silicone resins with the average composition $(MeSiO_{3/2})_{0.22}(i\text{-}OctSiO_{3/2})_{0.05}(MeSi(OH)O_{2/2})_{0.01}$ $(MeSi(OMe)O_{2/2})_{0.33}(i\text{-}OctSi(OMe)O_{2/2})_{0.11}(MeSi(OMe)_2O_{1/2})_{0.20}(i\text{-}OctSi(OMe)_2O_{1/2})_{0.08}$ with Mw=1500 g/mol, Mn=650 g/mol, and Mw/Mn=2,3 denoted as silicone resin 1 and a silicone resin with the average composition $(MeSiO_{3/2})_{0.33}(MeSi(OH)O_{2/2})_{0.05}(MeSi(OEt)O_{2/2})_{0.01}(Me_2SiO_{2/2})_{0.06}(PhSiO_{3/2})_{0.24}(PhSi(OH)O_{2/2})_{0.28}(PhSi(OEt)O_{2/2})_{0.03}$ with Mw=3250 g/mol, Mn=1300 g/mol, and Mw/Mn=2,5 denoted as silicone resin 2.

The silicone resins may be prepared by methods which are commonplace within chemistry, and/or are commercial products, such as the products SILRES® IC 368, SILRES® IC 678, or SILRES® SY231, GENIOSIL® LX 368, GENIOSIL® LX 678 for example, available commercially from Wacker Chemie AG, Munich (DE).

The emulsions may further comprise long chain alkylalkoxysilanes, long chain meaning a relatively long chain of carbon atoms, preferably $C_8$ to $C_{30}$, more preferably $C_{12}$ to $C_{30}$. Further examples of component (B), with a+b+c=4, are n-octyltrimethoxysilane, n-octyltriethoxysilane, 2,4,4-trimethylpentyltrimethoxysilane, 2,4,4-trimethylpentyltriethoxysilane, hexadecyltrimethoxysilane, hexadecyltriethoxysilane, n-nonacosyltriethoxysilane, n-nonacosyltrimethoxysilane, n-triacontyltrimethoxysilane, and n-triacontyltriethoxysilane, hexadecylmethyldimethoxysilane, hexadecylmethyldiethoxysilane, 2,4,4-(trimethylpentyl) methyldimethoxysilane, 2,4,4-(trimethyl-pentyl) methyldi ethoxysilane, n-octylmethylditrimethoxysilane, and n-octylmethyldiethoxysilane.

Component (C), the emulsifier, may be any suitable ionic emulsifier, nonionic emulsifier, Gemini emulsifier, or amphotropic emulsifier, individually and in the form of mixtures of different emulsifiers. The emulsifier may be used in pure form or as solutions of one or more emulsifiers in water or organic solvents.

Examples of suitable anionic emulsifiers are as follows:

Alkyl sulfates, particularly those having a chain length of 8 to 18 carbon atoms, alkyl and alkaryl ether sulfates having 8 to 18 carbon atoms in the hydrophobic radical and 1 to 40 ethylene oxide (EO) and/or propylene oxide (PO) units.

Sulfonates, particularly alkylsulfonates having 8 to 18 carbon atoms, alkylarylsulfonates having 8 to 18 carbon atoms, taurides, esters, including monoesters, of sulfosuccinic acid with monohydric alcohols or alkylphenols having from 4 to 15 carbon atoms; if desired, these alcohols or alkylphenols may also have been ethoxylated with 1 to 40 EO units.

Alkali metal salts and ammonium salts of carboxylic acids having 8 to 20 carbon atoms in the alkyl, aryl, alkaryl, or aralkyl radical.

Phosphoric acid partial esters and their alkali metal salts and ammonium salts, particularly alkyl and alkaryl phosphates having 8 to 20 carbon atoms in the organic radical, alkyl ether phosphates and alkylaryl ether phosphates having 8 to 20 carbon atoms in the alkyl or alkaryl radical and 1 to 40 EO units.

Examples of nonionic emulsifiers are as follows:

Polyvinyl alcohol still containing about 5-50%, preferably about 8-20%, of vinyl acetate units, with a degree of polymerization of 500 to 3000.

Alkyl polyglycol ethers, preferably those having 3 to 40 EO units and alkyl radicals of 8 to 20 carbon atoms.

Alkylaryl polyglycol ethers, preferably those having 5 to 40 EO units and 8 to 20 carbon atoms in the alkyl and aryl radicals.

Ethylene oxide/propylene oxide (EO/PO) block copolymers, preferably those having 8 to 40 EO/PO units.

Adducts of alkylamines having alkyl radicals of 8 to 22 carbon atoms with ethylene oxide or propylene oxide.

Fatty acids having 6 to 24 carbon atoms.

Alkylpolyglycosides of the general formula R*—O—$Z_o$, in which R* is a linear or branched, saturated or unsaturated alkyl radical having on average 8-24 carbon atoms and $Z_o$ is an oligoglycoside residue containing on average o=1-10 hexose or pentose units or mixtures thereof.

Natural substances and derivatives thereof, such as lecithin, lanolin, saponins, cellulose; cellulose alkyl ethers and carboxyalkylcelluloses whose alkyl groups each possess up to 4 carbon atoms.

Linear organo(poly)siloxane-containing polar groups containing in particular the elements O, N, C, S, P, Si, especially those having alkoxy groups with up to 24 carbon atoms and/or up to 40 EO and/or PO groups.

Examples of cationic emulsifiers are as follows:

Salts of primary, secondary, and tertiary fatty amines having 8 to 24 carbon atoms with acetic acid, sulfuric acid, hydrochloric acid, and phosphoric acids.

Quaternary alkylammonium and alkylbenzeneammonium salts, especially those whose alkyl groups possess 6 to 24 carbon atoms, particularly the halides, sulfates, phosphates, and acetates.

Alkylpyridinium, alkylimidazolinium, and alkyloxazolinium salts, especially those whose alkyl chain possesses up to 18 carbon atoms, particularly the halides, sulfates, phosphates, and acetates.

Especially preferred is a combination of surfactants with at least one emulsifier having more than 16 EO units.

Specific examples of useful emulsifiers include nonionic secondary alcohol ethoxylates such as isotridecylether, ethoxylated isotridecanol, ethoxylated castor oil, an ethoxylated nonionic emulsifier made from a saturated iso-C13 alcohol, octylphenol ethoxylate, a blend of ethoxylated castor oil blended with an ethoxylated nonionic emulsifier made from a saturated iso-C13 alcohol, the like, or a combination thereof.

Fillers, component (E), may be used for thickening of the compound, reinforcing the binder, giving the grout a texture, and/or increasing the compound volume. The fillers may include diatomaceous earth, talc, lime, barytes such as barium sulfate, clay, kaolin clay, precipitated or ground calcium carbonate, chalk, limestone, marble, magnesium carbonate, dolomite, fine quartz, silicates, the like, or a combination thereof.

The fillers the may be filler aggregates. Suitable aggregates are, for example, coarsely ground minerals, including limestone, marble, dolomite, quartz, basalt, and other substantially water-insoluble minerals. Very preferred aggregates are those of calcium carbonate, sand, whether based on quartz minerals, i.e. silica sand, or limestone precursors such as the abraded shells of marine mollusks. The weight average particle size of the aggregate should be from approximately 1 μm to less than 1 mm. Aggregate having average particle size of 1.5 μm to 1.0 mm, more preferably 2 μm to 0.1 mm, most preferably 3 μm to 0.05 mm are suitable. Aggregate having sieve sizes of 0.02 mm to 1.0 mm (corresponding to US standard mesh 632 to 18), more preferably 0.037 mm to 0.595 mm (corresponding to US standard mesh 400 to 30), and most preferably 0.044 to 0.3 mm (corresponding to US standard mesh 325 to 50), are also suitable. Most preferable aggregates include calcium carbonate and sand with these sizes. More than one type of aggregate may be used, and each type of aggregate may be used in a variety of particle sizes. Preferably mixtures of aggregates are used having different particle distributions. The aggregates are preferably thoroughly dried before admixing with the curable polymer component. Drying may be accomplished, for example, in pan driers, rotating bed dryers, fluidized bed dryers, and all other dryers suitable for removing traces of moisture from the aggregate. The amount of water remaining in the aggregate after drying should preferably be such that the completed grout is storage stable at 50° C. with the exclusion of moisture for at least one month, and preferably for longer periods of time such as one year or longer.

Non-limiting examples of optional catalysts, component (F), are all known condensation catalysts such as metal compounds such as aluminum (III) neodecanoate, aluminum (III) stearate, aluminum (III) ethoxide, aluminum (III) octoate, aluminum (III) ethylhexanoate, aluminum (III) propoxide, aluminum (III) butoxide, aluminum (III) acetylacetonate, aluminum (III)-(9-octadecenylacetoacetate) diisopropoxide, zinc (II) stearate, zinc (II) octoate, zinc (II)-(2-ethylhexanoate), zinc (II)-(acetylacetonate), zinc (II)-bis-(2,2,6,6-tetramethyl-3,5-heptandionate), strontium (II)-(2-ethylhexanoate), titanium (IV)-bis (ethylacetoacetato)-bis (isobutanolato), titanium (IV)-(n-butoxide), titanium (IV)-(t-butoxide), zirconium (IV) acetylacetonate, zirconium (IV)-(2-ethylhexanoate), zirconium (IV) lactate, lithium (I)-octanoate, bismuth (III) neodecanoate, dioctyltin (IV) laurate, dibutyltin (IV) laurate, dimethyltin (IV) laurate, dioctyltin (IV) oxide, dibutyltin (IV) oxide, dimethyltin (IV) oxide, dioctyltin (IV) acetate, dibutyl tin (IV) acetate, a compound available by reaction of dioctyltin (IV) acetate with tetraethoxysilane, a composition available by reaction of dibutyltin (IV) acetate with tetraethoxysilane, tin (II) octoate, lead (II) acetate, lead (II) octoate, lead (II) oxide, lead (II) sulfide, lead (II) carbonate, nickel (II) acetylacetonate, nickel (II) acetate, nickel (II) octoate, nickel (II) carbonate, cobalt (II) octoate, cobalt (II) carbonate, manganese (II) octoate, manganese (II) carbonate, manganese (IV) oxide; acids such as carboxylic acids, dicarboxylic acids, organophosphoric acid, and their mono- and di-esters, phosphonic acids and their monoesters and diorganophosphine acids, boric acid, boron (III) fluoride, ammonium salts of carboxylic acids and anhydrides; bases such as alkali and alkaline earth metal hydroxide, alkali and earth alkali metal and butyllithium; amines such as triorganyloxyamine, monoorganylamine, diorganylamine (cyclic systems such as piperidine, piperazine (1,4-diazacyclohexane), pyrrolidine, homopiperazine (1,4-diazepane), 7-azabicyclo [2.2.1] heptanes, or bispidine), triorganylamine (and DABCO (1,4-diazabicyclo [2.2.2] octane)), 4,5-dihydro-1H-imidazole, 2-organyl-4,5-dihydro-1H-imidazole, and organylamidine, 1,4,5,6-tetrahydropyrimidine, 2-organyl-1,4,5,6-tetrahydropyrimidine, 1,5-diazabicyclo [4.3.0]non-5-ene, 1,8-diazabicyclo [5.4.0] undec-7-ene, 1,5,7-triazabicyclo [4.4.0] dec-5-ene, 7-methyl-1,5,7-triazabicyclo [4.4.0] dec-5-ene, aminomethanamidine, 1-methylguanidine, N,N'-dimethylguanidine, N,N,N',N'-tetramethylguanidine, N,N,N',N'-tetramethyl-N''-aryl-guanidine, N,N,N',N'-tetramethyl-N''-[4-morpholinyl-(phenylimino)methyl]guanidine, 1-methyl-3-nitroguanidine, 1.8-bis (tetramethylguanidino) naphthalene and guanylguanidine, 1-methylguanylguanidine.

In addition, non-limiting examples of additives, component (G), such as pigments, stabilizers, preservatives, used in the emulsions of the present invention include any following substances.

Pigments may be used to contribute color or opacity, protect the grout from UV light, increase hardness, decrease ductility, and/or adjust gloss level. The pigments may be synthetic or natural. Examples of pigments may include clays, calcium carbonate, mica, silicas, talcs, calcined clays, blanc fixe, precipitated calcium carbonate, synthetic pyrogenic silicas, the like, or a combination thereof.

Examples of inorganic pigments may include aluminum pigments such as silicates of sodium and aluminum containing sulfur (ultramarine violet) and a complex naturally occurring pigment of sulfur-containing sodio-silicate $(Na_{8-10}Al_6Si_6O_{24}S_{2-4})$ (ultramarine); barium copper pigments such as Chinese purple $(BaCuSi_2O_6)$ and dark blue $(BaCu_2Si_2O_7)$, copper pigments such as a synthetic pigment of calcium copper silicate $(CaCuSi_4O_{10})$, cupric acetoarsenite $(Cu(C_2H_3O_2)_2.3Cu(AsO_2)_2)$; barium pigments such as barium sulfate $(BaSO_4.)$; manganese pigments such as manganic ammonium pyrophosphate $(NH_4MnP_2O_7)$; cobalt pigments such as cobalt stannate $(CoO_3Sn)$, potassium cobaltinitrite $(Na_3Co(NO_2)_6)$, cobalt chromite $(CoCr_2O_4)$, cobalt titanate $(Co_2TiO_4)$; iron pigments such as a synthetic pigment of ferric hexacyanoferrate $(Fe_7(CN)_{18})$, a naturally occurring clay of monohydrated ferric oxide $(Fe_2O_3.H_2O)$, anhydrous $Fe_2O_3$; cadmium pigments such as cadmium sulfide (CdS), cadmium sulfoselenide $(Cd_2SSe)$, cadmium selenide (CdSe); chromium pigments such as chromic oxide $(Cr_2O_3)$, a pigment of hydrated chromic oxide $(Cr_2O_3.H_2O)$, natural pigment of plumbous chromate $(PbCrO_4)$, a naturally occurring pigment mixture composed of lead(II) chromate and lead(II) oxide $(PbCrO_4+PbO)$; arsenic pigments such as monoclinic arsenic sulfide $(As_2S_3)$; lead pigments such as lead antimonite $(Pb(SbO_3)_2)$, basic plumbous carbonate $((PbCO_3)_2.Pb(OH)_2)$; mercury pigments such as mercuric sulfide (HgS); carbon pigments such as carbon black; antimony pigments such as stibous oxide $(Sb_2O_3)$; zinc pigments such as zinc oxide (ZnO) or zinc chromate $(ZnCrO_4)$; titanium pigments such as nickel antimony titanium yellow rutile $(NiO.Sb_2O_3.20TiO_2)$ or titanium dioxide $(TiO_2)$; a complex sulfur-containing sodio-silicate $(Na_{8-10}Al_6Si_6O_{24}S_{2-4})$ containing lazurite known as ultramarine blue, or the like.

Examples of organic pigments may include diarylide aniline yellow pigment; benzimidazole yellow dyes; heterocyclic yellow dyes; disazo condensation yellow dyes such as arylide yellow, isoindoline yellow, methane yellow, tetrachloroisoindolinone yellow, azomethine yellow, quinophthalone yellow, or triazinyl yellow, naphthol orange, calrion red, benzimidazolone orange; phthalocyannine green dyes with chemical formula ranging from $C_{32}H_3Cl_{13}CuN_8$ to $C_{32}HCl_{15}CuN_8$, copper phthalocyannine; 8,18-dichloro-5,15-diethyl-5,15-dihydrodiindolo(3,2-b:3',2'-m)tri-phenodioxazine known as diooxazine violet, or the like.

Pigments may include hiding pigments protecting the grout from UV light such as titanium dioxide, optionally coated with silica/alumina/zirconium, phthalocyannine blue dye, or red iron oxide.

Additives may serve a variety of functions such as to modify surface tension, flow and leveling properties, appearance, gloss, texturing, increase wet edge and/or antifreeze properties, improve pigment stability, control foaming and/or skinning, modify rheology, modify mar resistance, act as catalysts, driers, thickeners, stabilizers, emulsifiers, texturizers, adhesion promoters, UV stabilizers, corrosion inhibitors, texturizers, de-glossing agents, biocides, fungicides, insecticides, algaecides, the like, or a combination thereof.

Examples of additives may be silicone polyether copolymers, a dispersion of high molecular weight polysiloxane or polydimethylsiloxane and silicone surfactant as additives increasing mar resistance and providing or improving slip; ethylene oxide surfactants; silicone emulsions, fluorosilicone, organo-modified silicone copolymers as additives providing foam control; aminopropyltriethoxysilane, 3methacryloxypropyltrimethoxysilane, cationic vinylbenzyl and amino-functionalmethoxy-silane, glycidoxypropyltrimethoxysilane, silanol-functional additives, aqueous solutions of amino-functional silicone polymers as adhesion promoters and pigment treatment additives; silane/siloxane blends as additives promoting water resistance; arylalkyl-modified silicone, silicone polyether copolymers as additives improving leveling and gloss; silicone elastomer particles with epoxy functionality improving abrasion resistance and adding a smooth, matter finish; silicone polyether copolymers as additives enhancing substrate wetting; 2,2'-(2,5-thiophenediyl)bis(5-tert-butylbenzoxazole) as an optical brightener; 2-[2-hydroxy-3,5-di-(1,1-dimethylbenzyl)]-2H-benzotriazole, 2-(2H-benzotriazole-2-yl)-4-methylphenyl as UV light absorbers; tris(2,4-di-tert-butylphenyl)phosphite, stearyl-3-(3',5'-di-tert-butyl-4-hydroxyphenyl) propionate, 2,2'-methylenebis (4-methyl-6-tert-butylphenol) as stabilizers; tetrachloroisophthalonitrile, 3-iodo-2-propynyl butyl carbamate, 2-n-octyl-4-isothiazolin-3-one, diiodomethyl-p-tolysulphone, N-(trimethylthio) phtalamine, 1,2-benzisothiazolin-3-one as biocides; 2-(4-thiazolyl(benzimidazole), dichloroctylisothiazolone as fungicide/algaecide; potassium sodium phosphate as a buffer; hydrophobic copolymer polyelectrolyte as a pigment dispersant; modified hydroxyethyl methyl cellulose, as a thickener; modified polyols as foam suppressors; ester alcohol as a coalescent; calcium carbonate as an extender; talc as an additive to provide pigment spacing, firmness, anti-cracking, and barrier properties; aqueous butyl acrylate-styrene copolymer for dispersion; and (N-(2-aminoethyl)-3-aminopropyltrimethoxysilane, and aqueous acetic acid as catalysts. Any other additive for interior and exterior paint is also contemplated.

A method of preparation of exemplary elastomeric silicone emulsions of the general formula described above is provided in Examples 1-3 below.

Example 1: Preparation of a α,ω-dimethoxymethyl-silylmethylcarbamate-Terminated Polypropyleneglycol Emulsion An emulsion was prepared according to the following method utilizing the following compositions and weight percentages.

| | INCI Name | Amount (wt. %) | Amount (g) |
|---|---|---|---|
| pre-mixed polymer blend | α,ω-dimethoxymethylsilylmethylcarbamate-terminated polypropyleneglycol | 15.00 | 75.00 |
| | silicone resin 1* | 20.00 | 100.00 |
| | silicone resin 2** | 15.00 | 75.00 |
| | isotridecylether*** | 3.00 | 15.00 |
| | water | 46.86 | 234.30 |
| | preservative 1**** | 0.09 | 0.45 |
| | preservative 2***** | 0.05 | 0.25 |
| | Totals | 100.00 | 500.00 |

*silicone resin 1 is a silicone resin with the average composition $(MeSiO_{3/2})_{0.22}(i\text{-}OctSiO_{3/2})_{0.05}(MeSi(OH)O_{2/2})_{0.01}(MeSi(OMe)O_{2/2})_{0.33}(i\text{-}OctSi(OMe)O_{2/2})_{0.11}(MeSi(OMe)_2O_{1/2})_{0.20}(i\text{-}OctSi(OMe)_2O_{1/2})_{0.08}$ with Mw = 1500 g/mol, Mn = 650 g/mol, and Mw/Mn = 2.3;
**silicone resin 2 is a silicone resin with the average composition $(MeSiO_{3/2})_{0.33}(MeSi(OH)O_{2/2})_{0.05}(MeSi(OEt)0_{2/2})_{0.01}(Me_2SiO_{2/2})_{0.06}(PhSiO_{3/2})_{0.24}(PhSi(OH)O_{2/2})_{0.28}(PhSi(OEt)O_{2/2})_{0.03}$ with Mw = 3250 g/mol, Mn = 1300 g/mol, and Mw/Mn = 2.5;
***emulsifier with a viscosity of 30 mPas at 60° C., degree of ethoxylation 10, cloud point in water 70° C., and molar mass 630 g/mol;
****preservative 1 is a mixture of 3 parts by weight of 5-chloro-2-methyl-2H-isothiazol-3-one and 1 part by weight of 2-methyl-2H-isothiazol-3-one as 1.5 wt. -% solution in water;
*****preservative 2 is 2-methyl-2H-isothiazol-3-one as a 10 wt. -% solution in water.

The emulsion in Example 1 was prepared by the following steps:

A polymer mixture was prepared by mixing α,ω-dimethoxymethylsilylmethylcarbamate-terminated polypropyleneglycol with the silicone resin 1 and the silicone resin 2 on a mixer. The polymer mixture was then emulsified by mixing the polymer mixture with the emulsifier for 3 minutes while homogenizing the polymer mixture at about 4,000 rpm. Subsequently, 10 g of water was added to the polymer mixture and a gel like paste was obtained. The paste was further homogenized for additional 5 minutes at 4,000 rpm. The paste was then diluted by slowly adding the remaining amount of water within 5 minutes. Finally, the preservatives were added to the resulting mixture.

Examples 2 and 3: Preparation of Additional Useful Exemplary Emulsions

Additional exemplary useful emulsions of Examples 2 and 3 were prepared according to the method described below, utilizing the following components and weight percentages:

Example 2

| | INCI Name | Amount (wt. %) | Amount (g) |
|---|---|---|---|
| pre-mixed polymer blend | α,ω-dimethoxymethylsilylmethylcarbamate-terminated polypropyleneglycol | 4.15 | 18.68 |
| | T functional, low molecular weight methyl siloxane* | 8.35 | 37.58 |
| | ethoxylated glyceride | 2.00 | 9.00 |
| | C13 oxo alcohol ethoxylate with 6EO | 1.00 | 4.50 |
| | 4,4-dimethyloxazolidine | 0.20 | 0.90 |
| | water | 46.80 | 210.60 |
| | emulsified silicone resin 3** | 37.50 | 168.80 |
| | Totals | 100.00 | 450.00 |

*T functional, low molecular weight silicone resin with the average composition $(MeSiO_{3/2})_{0.38}(MeSi(OEt)O_{2/2})_{0.46}(MeSi(OEt)_2O_{1/2})_{0.15}(Me_2SiO_{2/2})_{0.01}$ with molecular weights $M_w$ = 2800 g/mol, $M_n$ = 1000 g/mol;
**methyl-phenyl silicone resin with kinematic viscosity of 280 mm$^2$/s at 25° C. measured according to DIN 51562, alkoxy content of approximately 15 wt. %, total silicone content of about 84 wt. %, and density at 20° C. and 1013 hPa 1.2 g/cm$^3$ measured according to DIN 51757 was emulsified using about 50 wt. % solid methyl-phenyl resin described above and about 50 wt. % of a mixture of water, ethoxylated glyceride, C13 oxo alcohol ethoxylates, and 4,4-dimethyloxazolidine.

Example 3

| | INCI Name | Amount (wt. %) | Amount (g) |
|---|---|---|---|
| pre-mixed polymer blend | α,ω-dimethoxymethylsilylmethylcarbamate-terminated polypropyleneglycol | 41.65 | 187.42 |
| | T functional, low molecular weight methyl siloxane* | 8.35 | 37.58 |
| | ethoxylated glyceride | 2.00 | 9.00 |
| | C13 oxo alcohol ethoxylates with 6EO | 1.00 | 4.50 |
| | 4,4-dimethyloxazolidine | 0.20 | 0.90 |
| | water | 46.80 | 210.60 |
| | Totals | 100.00 | 450.00 |

*T functional, low molecular weight methyl siloxane is a silicone resin with the average composition $(MeSiO_{3/2})_{0.38}(MeSi(OEt)O_{2/2})_{0.46}(MeSi(OEt)_2O_{1/2})_{0.15}(Me_2SiO_{2/2})_{0.01}$ with molecular weights $M_w$ = 2800 g/mol, $M_n$ = 1000 g/mol.

The emulsions of Examples 2 and 3 were prepared by the following steps:

A polymer mixture was prepared by mixing α,ω-dimethoxymethylsilylmethylcarbamate-terminated polypropyleneglycol with T functional, low molecular weight methyl siloxane on a mixer. The polymer mixture was then emulsified by mixing the polymer mixture with the emulsifiers, C13 oxo alcohol ethoxylates and ethoxylated glyceride for 3 minutes while homogenizing the mixture at about 4,000 rpm. Subsequently, 10 g of water was added to the polymer mixture and a paste was obtained. The paste was further homogenized for additional 5 minutes at 4,000 rpm. The paste was then diluted by slowly adding the remaining amount of water within 5 minutes. Finally, the preservative, 4,4-dimethyloxazolidine, was added to the mixture. The grout of Example 2 was then mixed with emulsified silicone resin 3.

Emulsions with substantially the same properties can be prepared utilizing an alternative emulsifier such as an ethoxylated castor oil blended with an ethoxylated nonionic surfactant made from a saturated iso-C13 alcohol conforming to the structural formula:

$$RO(CH_2CH_2O)_xH,$$

wherein:
R represents iso-$C_{13}H_{27}$, and
x=a range from 1-20, preferably 5-16.

The relative amounts of individual components in the emulsions based on 100% of the whole ingredients as mixed together may be as disclosed herein. The relative amount of the silyl-terminated polymer (A) may be about 1 to 30 wt. %, more preferably about 1 to 20 wt. %, most preferably about 1 to 15 wt. %.

The relative amount of the silicone compound (B) may be about 0 to 30 wt. %, more preferably about 1 to 20 wt. %, most preferably about 1 to 15 wt. %.

The relative amount of the silyl-terminated polymer (A) and the relative amount of the silicone compound (B) together is most preferably in the range of 8 to 20 wt. %.

The relative amount of the emulsifier (C) may be about 0.1 to 5 wt. %, more preferably about 0.5 to 5 wt. %, most preferably about 0.5 to 2 wt. %.

The relative amount of water (D) may be about 5 to 30 wt. %, more preferably about 5 to 20 wt. %, more preferably about 10 to 20 wt. %.

The relative amount of filler aggregates (E) may be about 50 to 90 wt. %, more preferably about 60 to 80 wt. %, most preferably about 60 to 75 wt. %.

The relative amount of catalysts (F) and/or additives (G) may be about 0 to 10 wt. %, more preferably about 0 to 5 wt. %, most preferably about 0.01 to 2 wt. %.

Non-limiting examples of a grout utilizing emulsions of the present invention were prepared using the following components.

allowed to dry for 2-3 days in the molds. Afterwards, the examples were pulled out of the molds and turned face down to prevent exposure to air. The examples were then allowed to dry for additional 7 days. Dry Shore D Durometer, was measured afterwards at about 50% humidity and 21.1° C. (70° F.) in the laboratory. The examples were weighed and submerged in water so that about 2.54 cm (1 inch) of water was above each example for a period of 24 hours. After 24 hours, the examples were removed from the water, weighted, and Wet Shore D Durometer was measured.

The tensile strength was measured according to modified ASTM C 307 method, using samples cast into individual molds measuring 5.08 cm (2 inches) in length, shaped like dog bones, which were filled with grout Examples A-C until the thickness reached about 0.9 cm (¼ inch). The examples were allowed to dry for 2-3 days in the molds. Afterwards, the examples were pulled out of the molds and turned face down to prevent exposure to air. The examples were then allowed to dry for additional 7 days and tensile strength and elongation was measured. Elongation was measured as a length each sample traveled prior to tensile breakage under the same modified test method.

The flexural strength was measured according ISO 178: 2011-04 method A, using a speed of 2 mm/min and a

| Component No. | Name | Example A [g/wt. %] | Example B [g/wt. %] | Example C [g/wt. %] |
|---|---|---|---|---|
| 1 | Emulsion of Example 1 | 400/30.53 | 0/0 | 0/0 |
| 1 | Emulsion of Example 2 | 0/0 | 431.10/32.14 | 0/0 |
| 1 | Emulsions of Example 3 | 0/0 | 0/0 | 363.64/28.55 |
| 2 | dispersant - hydrophobic copolymer polyelectrolyte | 6/0.46 | 6/0.45 | 6/0.47 |
| 3 | mineral spirits | 1/0.08 | 1/0.07 | 1/0.08 |
| 4 | BS 16- pH modifier - dichloroctylisothiazolone | 1/0.08 | | 1/0.08 |
| 5 | water-based, VOC-free microbiocide | 1/0.08 | 1/0.07 | 1/0.08 |
| 6 | ammonia 28% | 1/0.08 | 1/0.07 | 1/0.08 |
| 7a | calcium carbonate with mean particle size 15-25 μm | 774/59.08 | 774/57.71 | 774/60.77 |
| 7b | sodium-potassium alumina silicate | 108/8.24 | 108/8.05 | 108/8.48 |
| 7c | calcium carbonate with mean particle size of less than 10 μm | 18/1.37 | 18/1.34 | 18/1.41 |
| | Total | 1310/100.00 | 1341.10/100.00 | 1273.64/100.00 |

The following steps were taken to prepare grout Examples A-C:

Components Nos. 2-6 were added to each component no. 1, the emulsion. Components Nos. 7a-7c were then premixed on a mixer. All Examples A-C contain more than one type of component 7, an aggregate. The premixed aggregate was then slowly added to the mixtures of the components 2-6 according to the table above. The resulting grout mixture was then placed in a container, capped with nitrogen blanket, and sealed for later use.

Three samples of each Example A-C were cast into individual molds measuring 5.08 cm×5.08 cm (2×2 inches) which were filled with grout Examples A-C until the thickness reached about 0.95 cm (⅜ inch). The examples were distance of the supporting pins of 60 mm. Samples with the dimensions length×width×thickness=80 mm×10 mm×4 mm were prepared using a PTFE mold having a cavity with a depth of the thickness of the samples. The examples were allowed to dry for 2-3 days in the molds. Afterwards, the examples were pulled out of the molds and turned face down to prevent exposure to air. The examples were then allowed to dry for additional 7 days and flexural strength was measured.

The test results for Dry and Wet Shore D Durometer and water uptake for Examples A-C are provided in the tables below.

| Example | A1 | A2 | A3 | B1 | B2 | B3 | C1 | C2 | C3 |
|---|---|---|---|---|---|---|---|---|---|
| Dry Shore D Durometer | 35 | 37 | 33 | 36 | 37 | 39 | 32 | 32 | 39 |
| Dry Shore D Durometer- | | 35 | | | 37 | | | 34 | |

-continued

| Example | A1 | A2 | A3 | B1 | B2 | B3 | C1 | C2 | C3 |
|---|---|---|---|---|---|---|---|---|---|
| Average Water Uptake Initial Dry Weight [g] | 17.55 | 18.01 | 17.68 | 11.76 | 11.35 | 9.79 | 17.41 | 18.99 | 19.17 |
| Water Uptake-24 hours-Weight [g] | 18.91 | 19.35 | 18.95 | 12.48 | 12.01 | 10.32 | 20.18 | 19.92 | 18.31 |
| Water Uptake-Average [%] | | 7.46 | | | 5.78 | | | 5.44 | |
| Wet Shore D Durometer | 25 | 25 | 25 | 31 | 31 | 32 | 27 | 27 | 26 |
| Wet Shore D Durometer-Average | | 25 | | | 31 | | | 27 | |
| Difference between Dry and Wet Shore D Durometer | | 10 | | | 6 | | | 6 | |

The test results for tensile strength for Examples A2, B2, and C2 are provided in the table below.

| Example | A2 [psi] | A2 [MPa] | B2 [psi] | B2 [MPa] | C2 [psi] | C2 [MPa] |
|---|---|---|---|---|---|---|
| Tensile Strength 1 | 621 | 4.28 | 520 | 3.59 | 144 | 0.99 |
| Tensile Strength 2 | 539 | 3.72 | 563 | 3.88 | 147 | 1.01 |
| Tensile Strength 3 | 721 | 4.97 | 458 | 3.16 | 119 | 0.82 |
| Tensile Strength 4 | * | * | 526 | 3.63 | * | * |
| Tensile Strength-Average | 627 | 4.32 | 517 | 3.56 | 137 | 0.94 |

*data was not collected

The test results for elongation for Examples A2, B2, and C2 are provided in the table below.

| Example | A2 | B2 | C2 |
|---|---|---|---|
| Elongation 1 | 2 | 2 | 12 |
| Elongation 2 | 3 | 2 | 5 |
| Elongation 3 | 1 | 1 | 7 |
| Elongation 4 | * | 1 | * |
| Elongation - Average | 2 | 2 | 8 |

* data was not collected

The test results for flexural strength for Examples A2 and C2 are provided in the table below.

| Example | A2 [MPa] | C2 [MPa] |
|---|---|---|
| Flexural Strength 1 | 2.12 | 1.69 |
| Flexural Strength 2 | 1.25 | 1.61 |
| Flexural Strength 3 | 1.18 | 1.88 |
| Flexural Strength 4 | * | 2.05 |
| Flexural Strength - Average | 1.52 | 1.81 |

* data was not collected

To provide comparison between the subject invention one-component high-performance grout compositions and commercially available grouts, the table below presents properties of commercially available grouts. The asterisks indicate test methods, which were used to assess various properties of the commercially available grouts listed below. A value without an asterisk indicates that the data was listed in the product's specification.

| | Type of Grout | | | |
|---|---|---|---|---|
| | Epoxy 2K* | Typical Commercial RTU Water-Based Acrylic | Typical Cementitious Grout** | Typical Polymer Modified Cementitious Grout*** |
| Water-Absorption 24 Hour (%) | 0.29 | 12.5 | >10** | >5*** |
| Flexural Strength (MPa) | 22.06 | 6.38 | 3.45** | 6.89*** |
| Flexural Strength (psi) | 3200 | 925 | 500** | 1000*** |
| Tensile Strength (MPa) | 6.89* | 1.47 | 2.07** | 3.45*** |
| Tensile Strength (psi) | 1000* | 213 | 300** | 500*** |
| Shore D Durometer | 75 | 30 | 80 | 75 |
| Wet Shore D Durometer | 73 | 5 | 80 | 75 |

*denotes ANSI A118.3 Standards
**denotes ANSI A118.6 Standards
***denotes ANSI A118.7 Standards The inventive one-component grout is storage stable in a premixed form in a container. Because the grout may be used without any on-site mixing, just by unsealing a container holding the grout, color uniformity of the grout applied throughout an area being worked on can be ensured. By using the pre-mixed one-component grout, a craftsman saves time which would otherwise be spent mixing two-component grout mixtures.

The inventive grout may be applied to different substrates such as ceramic tile, travertine tile, porcelain and non-porcelain tile, slate, marble, faux wood, masonry walls, or the like to fill voids, seal joints, and create waterproof seal. This is especially true concerning moderate to high-traffic applications such as high foot traffic areas, areas with high exposure to water, areas exposed to abrasive activity, areas where soiling is anticipated, residential and commercial entry areas, kitchens, bathroom floors and walls, balconies, swimming pools, fountains, tub surrounds, showers, countertops, or the like.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A storage stable one-component grout composition which is:

an aqueous emulsion, comprising:

(A) 1-30 wt. % of a silyl-terminated polymer of formula (I)

$$Y—[(CR^1_2)_b—SiR_a(OR^2)_{3-a}]_x \quad (I),$$

wherein

Y comprises a polyurethane or polyoxyalkylene polymer residue which is x-valent and bonded to $(CR^1_2)$ via nitrogen, oxygen, sulfur, or carbon, and when Y is a polyoxyalkylene polymer residue, Y is bonded to the silyl group $—[(CR^1_2)_b—SiR_a(OR^2)_{3-a}$ by an —O—C(=O)—NH— group R each independently is a monovalent, optionally substituted hydrocarbyl radical, $R^1$ each independently is hydrogen or a monovalent, optionally substituted hydrocarbyl radical optionally bonded to carbon of the $CR^1_2$ group via nitrogen, phosphorus, oxygen, sulfur, or a carbonyl group, $R^2$ each individually is hydrogen or a monovalent, optionally substituted hydrocarbyl radical, x is an integer from 1 to 10, a each individually is 0, 1, or 2, and b each individually is an integer from 1 to 10;

optionally (B), from 0-30 wt. % of a silicone resin containing units of the formula (II)

$$R^3_aR^4_b(R^5O)_cSiO_{(4-a-b-c)/2} \quad (II),$$

wherein $R^3$ each independently is alkyl, aryl, aminoalkyl, glycidoxy alkyl, mercapto alkyl, $R^4$ each independently is alkyl, aryl, $R^5$ each independently is alkyl or H, a is 0-3, b is 0-2, c is 0, 1, 2, or 3, with the proviso that a+b+c≤4; and (C) 0.1 to 5 wt. % of emulsifier(s);

(D) 5-30 wt. % of water;

(E) 50 to 90 wt. % of aggregate filler(s); and further optionally:

(F) catalyst(s); and/or (G) additive(s), wherein the weight percents are based on the total weight of the one-component grout composition, and wherein the weight percentages total 100% based on ingredients A) through G).

2. The one-component grout composition of claim 1, wherein end groups of the component (A) have the formula $$—O—C(=O)—NH—(CR^1_2)_b—SiR_a(OR^2)_{3-a} \quad (III),$$

wherein b is 1 and a is 0 or 1.

3. The one-component grout composition of claim 1, wherein the component (A) is α,ω-dimethoxymethylsilyl-methylcarbamate-terminated polypropyleneglycol.

4. The one-component grout composition of claim 1, wherein at least one silicone resin (B) is present.

5. The one-component grout composition of claim 4, wherein the component (B) comprises highly cross-linked polymers which are prepared by the hydrolysis of trichlorosilanes, trialkoxysilanes, tetrachlorosilanes, or tetraalkoxysilanes, and mixtures thereof.

6. The one-component grout composition of claim 4, wherein the component (B) comprises a silicone resin with the average composition $(MeSiO_{3/2})_{0.22}(i\text{-}OctSiO_{3/2})_{0.05}$ $(MeSi(OH)O_{2/2})_{0.01}(MeSi(OMe)O_{2/2})_{0.33}(i\text{-}OctSi(OMe)O_{2/2})_{0.11}(MeSi(OMe)_2O_{1/2})_{0.20}$ $(i\text{-}OctSi(OMe)_2O_{1/2})_{0.08}$ with Mw=1500 g/mol, Mn=650 g/mol, and Mw/Mn=2.3, a silicone resin with the average composition $(MeSiO_{3/2})_{0.33}(MeSi(OH)O_{2/2})_{0.05}(MeSi(OEt)O_{2/2})_{0.01}$ $(Me_2SiO_{2/2})_{0.06}(PhSiO_{3/2})_{0.24}(PhSi(OH)O_{2/2})_{0.28}(PhSi(OEt)O_{2/2})_{0.03}$ with Mw=3250 g/mol, Mn=1300 g/mol, and Mw/Mn=2.5, or a combination thereof.

7. The one-component grout composition of claim 1, wherein the filler aggregates comprise calcium carbonate, sand, or a combination thereof.

8. The one-component grout composition of claim 1, wherein the emulsion comprises about 1 to 20 wt. % of the component (A), about 1 to 20 wt. % of component (B), about 0.5 to 5 wt. % of the emulsifier (C), about 5 to 20 wt. % of water (D), and about 60 to 80 wt. % of aggregate fillers (F), and about 0 to 5 wt. % of catalysts (E) and/or additives (G).

9. The one-component grout composition of claim 1, wherein the sum of the amount of component (A) and the amount of component (B) is about 8 to 20 wt. % based on the total weight of the one-component grout composition.

10. The one-component grout composition of claim 1, wherein the filler aggregates comprise a mixture of calcium carbonate having a mean particle size of less than about 25 μm and sodium-potassium alumina silicate.

11. The one-component grout composition of claim 1, wherein the filler aggregates have mean particle size of about 1.5 μm to about 1.0 mm.

12. The one-component grout composition of claim 1, wherein the grout is a one-component system applicable without on-site mixing.

13. A composite structure, comprising a one-component grout composition of claim 1, applied into a void of a substrate, wherein the substrate is a ceramic tile, travertine tile, porcelain tile, slate, marble, faux wood, or a masonry wall.

* * * * *